United States Patent [19]
Rubin et al.

[11] Patent Number: 5,265,261
[45] Date of Patent: Nov. 23, 1993

[54] METHOD AND SYSTEM FOR NETWORK COMMUNICATIONS USING RAW MODE PROTOCOLS

[75] Inventors: Darryl E. Rubin; Kenneth E. Masden, both of Redmond; John W. King, Kirkland, all of Wash.

[73] Assignee: Microsoft Corporation, Redmond, Wash.

[21] Appl. No.: 12,629

[22] Filed: Feb. 2, 1993

Related U.S. Application Data

[63] Continuation of Ser. No. 394,103, Aug. 14, 1989, abandoned.

[51] Int. Cl.$^5$ .............................................. G06F 13/00
[52] U.S. Cl. .................................... 395/800; 395/200;
395/250; 364/DIG. 1; 364/239; 364/284;
364/284.1; 364/284.3; 364/284.4; 364/939;
364/940
[58] Field of Search ......................... 395/200, 250, 800

[56] References Cited

U.S. PATENT DOCUMENTS

| | | | |
|---|---|---|---|
| 4,343,042 | 8/1982 | Schrock et al. | 445/5 |
| 4,445,176 | 4/1984 | Burk et al. | 364/200 |
| 4,495,572 | 1/1985 | Bosen | 364/200 |
| 4,949,248 | 8/1990 | Caro | 364/200 |

OTHER PUBLICATIONS

Chou, Wushow et al., *Computer Communications*, vol. II, *Systems and Applications*, Prentice-Hall, New Jersey, 1985, pp. 134-135.
Sherer, W. Paul, "Design of the 3Com3+Local Area Network File System," *Digest of Papers*, Thirty-Second IEEE Computer Society International Conference, San Francisco, California, Feb. 23-27, 1987, pp. 1-5.
"File Sharing Protocol," Microsoft Networks/Open-NET, Nov. 7, 1988, pp. 1-43.
Hurwicz, "MS-DOS 3.1 Makes it Easy to use IBM PCs on a Network," *Data Communications*, vol. 14, No. 12, 1985, pp. 223-237.
Currie, W. Scott, *LANs Explained: a Guide to Local Area Networks*, Ellis Horwood Limited, Chichester, England, 1988, pp. 144-154.
Tanenbaum, Andrew S., *Computer Networks*, 2nd ed., Prentice-Hall, New Jersey, 1989, pp. 14-21.

Primary Examiner—Eddie F. Chan
Attorney, Agent, or Firm—Seed and Berry

[57] ABSTRACT

A method and system for sending data from a first computer through a communications line to a second computer. The second computer includes a redirector, a transport, a data buffer, and an application program. The method and system provides the transport with a read request to send data from the first computer to the second computer, and with a receive network control block which directs the transport to store the next data it receives directly in the data buffer. The transport sends the read request to the first computer. The first computer stores the data identified by the read request in a data block without a header. The first computer transmits the data block over the communications line to the transport. Using information contained in the network control block, the transport stores the requested data without the header directly in the data buffer.

10 Claims, 4 Drawing Sheets

METHOD AND SYSTEM FOR NETWORK COMMUNICATIONS USING RAW MODE PROTOCOLS

CROSS-REFERENCE TO RELATED APPLICATION

This application is a continuation of U.S. patent application Ser. No. 07/394,103, filed Aug. 14, 1989, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

TECHNICAL FIELD

This invention relates generally to a computer system for transmitting data on a computer network, and more specifically, to a method and system for transmitting data in raw mode.

BACKGROUND OF THE INVENTION

Local Area Networks (LANs) are very popular means for interconnecting computers, especially personal computers. These computers are interconnected, in part, so that data may be electronically transferred from one computer to another and so that users can share resources such as files.

Several different type computers and computer operating systems can exist on a given network. For example, some of the computers can run Microsoft's OS/2 operating system and other computers can run a Unix-based operating system. These different computer systems need to transfer information in a protocol. The use of protocols in diverse computer systems is somewhat analogous to the use of the transmission protocols of AM and FM radio. An AM radio can only receive AM protocol signals, an FM radio can only receive FM protocol signals. Similarly, diverse computer systems cannot communicate unless they use the same protocol.

One such protocol for computer system file sharing is defined in the document entitled "Microsoft Networks/OpenNET FILE SHARING PROTOCOL," which is available from Intel Corporation as Intel Part Number 138446, and is hereby incorporated by reference. Systems that use that protocol can obtain or provide remote file services in a network environment. This protocol is referred to as the System Message Block (SMB) protocol because the protocol defines how data is to be packaged with SMB headers to be transmitted on the network. The protocol defines a server which provides file services and a consumer that accesses those services.

The SMB protocol defines how typical file access functions are to be accomplished on a network. For example, to read data from a file the consumer formats an SMB-read request block and then sends the block to the server. When the server receives the request, it retrieves the data from its file system, formats an SMB-read data response message, and sends the message with the data to the consumer. The consumer would then repeat this process for the next part of the file to be read.

Figure 2A:
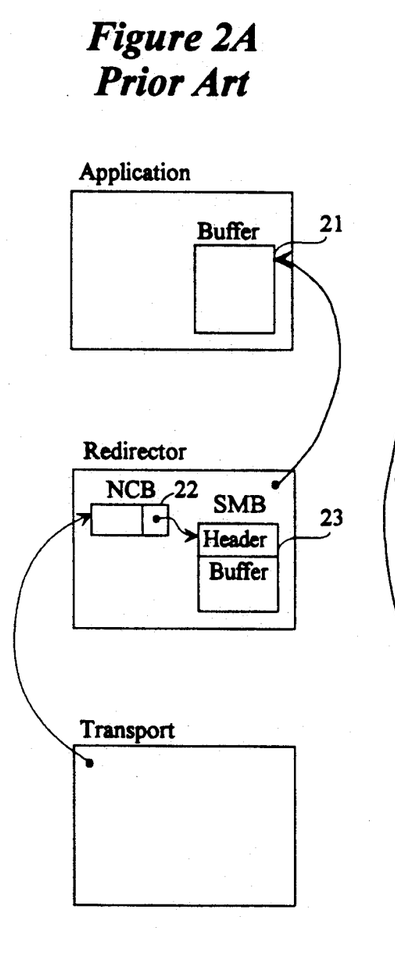
FIG. 2A shows the receiving of the read data in prior systems.

FIG. 2A shows how a consumer receives data from an SMB-read. In this example, an application program makes a call to the operating system requesting a file read and passing the address of the buffer 21 for the requested data. The kernel of the operating system determines that a file access is required and passes the call to the redirector, if the file is stored on network device.

The redirector effects the read request by calling the transport system and requesting the data be stored in the SMB-buffer 23. The SMB-buffer 23 may not be large enough to store the entire data requested. The application program may request a large portion of the file, for example, 64K bytes. A typical size of the SMB-buffer data area may be 4K. Consequently, the redirector will need to send 16 requests for 4K of data each. For each of the 16 requests, the redirector initializes a network control block (NCB) to point to an SMB-buffer that contains the SMB-read command. The NCB also contains a pointer to the SMB-buffer in which to store the requested data. The redirector then calls the transport system.

The transport system transports the SMB-read command to the file server. When the response to the read is received, the transport system stores the SMB data directly in the SMB buffer of the redirector and returns to the redirector. The received SMB data contains both header information and data.

The redirector then stores the 4k bytes of SMB-buffer data, not the header, in the application buffer. The redirector then proceeds to send an SMB request to get the next 4k of data and when it receives the data it copies the data into the appropriate location in the application buffer. This process continues until the entire 64K of data is received.

The use of the prior message protocol has several disadvantages. First, there is a high overhead associated with formatting and sending NCB and SMB block. Second, the use of small blocks is inefficient to transfer large blocks of data. Third, there is duplicate copying occurring as the transport system copies the data to the SMB buffer and then the redirector copies the data to the application buffer. It would be desirable to have a method and system for implementing a protocol in which data can be transferred without these disadvantages.

SUMMARY OF THE INVENTION

It is an object of the present invention to provide a method and system for sending a write request on a network and then sending the data directly from the application buffer to the network.

It is another object of the present invention to provide a method and system for receiving data from a network and storing the data directly in the application buffer.

It is another object of the present invention to provide a method in a computer system of requesting a read raw block transfer and a write raw block transfer in an efficient format.

These and other objects, which will become apparent as the invention is more fully described below, are obtained by an improved method and system for communication between a server and consumer.

DETAILED DESCRIPTION OF THE INVENTION

The present invention provides a method and system for transmitting data on a network in raw mode. In a preferred embodiment, data is transmitted on the network without the overhead of the SMB header and the data is stored directly into an application buffer, rather than stored into an SMB buffer.

Figure 1:
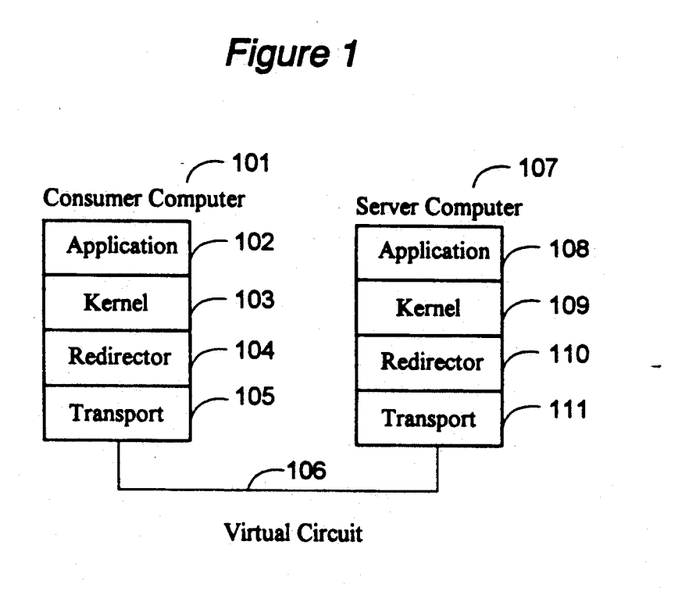
FIG. 1 shows a consumer and server along with the different system layers.

FIG. 1 shows the system layers for a consumer computer 101 that is connected to a server computer 107 through a virtual circuit (VC) 106. In a preferred embodiment, the redirector 104 implements an SMB protocol and the transport system 105 implements the network communication.

When data is transmitted in raw mode, the SMB-header blocks are not sent with the data. Thus, data can be written directly into an application buffer (not shown). However, the redirector 104 preferably ensures that no requests are pending on the virtual circuit 106 before raw data is sent. Otherwise, the redirector 104 would not know whether the data is the raw data or is data from another request because some data is sent directly to the application buffer.

In a preferred embodiment, the redirector 104 calls the read block raw and write block raw subroutines to implement the read raw and write raw protocols, respectively.

READ BLOCK RAW

Figure 2B:
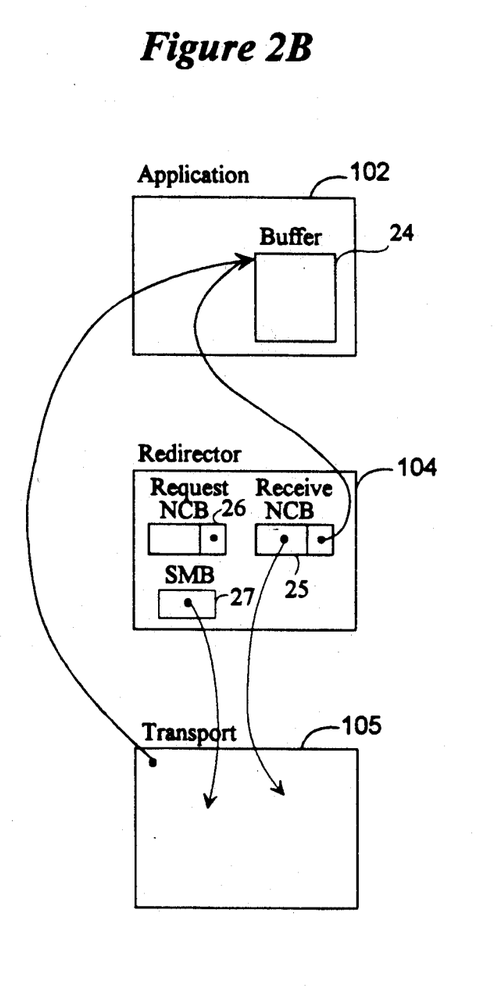
FIG. 2B shows the receiving of the read data in a preferred embodiment of the present invention.

In a preferred embodiment of the present invention, the redirector 104 implements the read raw protocol. The implementation is generally transparent to the application program 102, the kernel 103, and the file system, except for improved performance. Referring to FIG. 2B, an application program makes a call to the operating system requesting a file read and passing the address of the buffer 24 for the requested data. The kernel 103 (not shown) of the operating system invokes the redirector 104. The redirector 104 effects the read request by calling the transport 105 and requesting the data be stored directly in the application buffer 24. The redirector 104 initializes a receive network control block (NCB) 25 to receive data into the buffer 24. When the transport 105 receives the next data from the server computer 107 (not shown), the transport system will store the data directly into the application buffer 24. The redirector initializes the request NCB 26 to point to an SMB buffer 27 that contains the SMB read block raw command. The redirector 104 then requests the transport 105 to send the request on the network to the server computer 107 (not shown). The receive NCB 25 is sent to the transport 105 before the request NCB 26 is sent to the server computer 107 (not shown) to ensure that a fast server computer 107 will not send the raw data before the consumer computer 101 (not shown) is ready to receive it.

Appendix 1 contains a preferred format of the SMB read block raw format along with a description of how the consumer and server interact.

Figure 3:
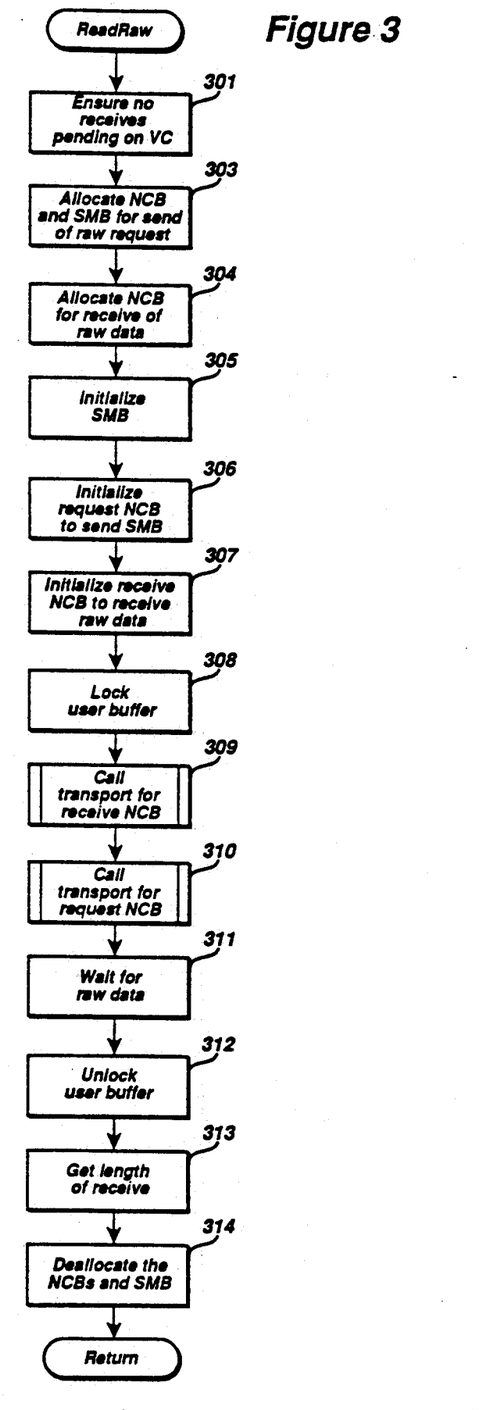
FIG. 3 shows a flow diagram of the read raw subroutine.

FIG. 3 is a flow diagram of a read raw subroutine that is called by the redirector. In block 301, the system ensures that consumer has no outstanding requests on the virtual circuit (VC) and that the consumer will not issue any requests for the duration of the read raw request. In block 303, the system allocates an NCB and an SMB data structure for the sending of the raw request. In block 304, the system allocates an NCB for the receiving of the raw data. In block 305, the system initializes the SMB header data and the SMB raw request variables that are shown in Appendix 1. In block 306, the system initializes the request NCB to send the SMB raw request. In block 307, the system initializes the receive NCB to receive raw data. In block 308, the system locks the user buffer, which ensures that the buffer will stay in memory until unlocked. In block 309, the system passes to the transport system the receive NCB, which tells the transport system to store the next data it receives directly in the user buffer. In block 310, the system passes the transport system the request NCB. The transport system transmits to the request SMB to the server. In block 311, the system waits until the raw data is received. In block 312, the system unlocks the user buffer. In block 313, the system gets the length of the raw data received from the transport system. In block 314, the system deallocates the NCBs and the SMB and then the subroutine returns.

Write Block Raw

In a preferred embodiment of the present invention, the redirector implements the write raw protocol. The implementation is generally transparent to the application program, the kernel, and the file system, except for improved performance. An application program makes a call to the operating system requesting to write data in raw mode and passing the address of the data buffer that contains the data. The kernel of the operating system invokes the redirector. The redirector effects the write by calling the transport system and sending a write raw request to the server. The redirector first initializes a request NCB to point to an SMB buffer that contains the SMB write block raw command. When the server responds with a verification that it is ready to receive the raw data, the redirector then is ready to send the data. The redirector then initializes a send NCB that points to the application data buffer to write. The redirector then passes the send NCB to the redirector to send the data to the server.

Appendix 2 contains a preferred format of the SMB write block raw format along with a description of how the consumer and server interact.

Figure 4:
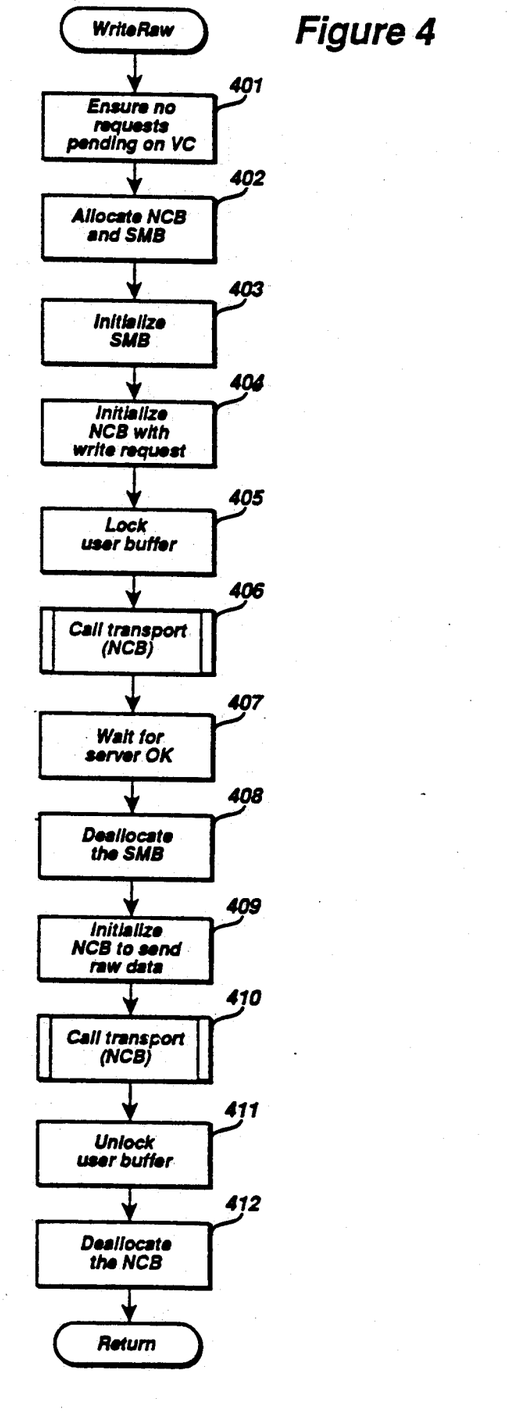
FIG. 4 shows a flow diagram of the write raw subroutine.

FIG. 4 is a flow diagram of the write raw subroutine that is called by the redirector. In block 401, the system ensures that the consumer has no outstanding requests on the virtual circuit (VC) and that the consumer will not issue any requests for the duration of the write raw request. In block 402, the system allocates an NCB and an SMB. The system uses the same NCB for the write request and the write. In block 403, the system initializes the SMB header and the SMB write raw variables that are defined in Appendix 2. In block 404, the system initializes the NCB block to send the SMB to the server. In block 405, the system locks the user buffer, which ensures that the buffer will remain in memory at that location. In block 406, the system passes the NCB to the transport system, which transmits the SMB to the server. In block 407, the system waits for the server to acknowledge that it is ready to receive the raw data. In block 408, the system deallocates the SMB; the NCB is not deallocated at this point as it is used to send the raw data. In block 409, the system initializes the NCB to send the raw data; the NCB contains a pointer to the user buffer. In block 410, the system passes the NCB to the transport system, which transmits the raw data to the server. In block 411, the system unlocks the user buffer. In block 412, the system deallocates the NCB and the subroutine returns.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

server. The response to that read will then tell the consumer that EOF was hit or identify the error condition.

As is true in the core read protocol (while reading a "standard blocked disk file"), the number of bytes returned may be less than the number requested only if a read specifies bytes beyond the current file size. In this case only the bytes that exist are returned. A read completely beyond the end of file will result in a response of zero length. If the number of bytes returned is less than the number of bytes requested, this indicates end of file (if reading other than a standard blocked disk file, only ZERO bytes returned indicates end of file).

The transport layer guarantees delivery of all re-

---

> ©1987 Microsoft Corporation

APPENDIX 1

SMB Protocol Extensions  November 7, 1988
9.2.14  READ BLOCK RAW

Request Format:
```
BYTE    smb_wct;       /* value=08*/
WORD    smb_fid;       /* file handle*/
DWORD   smb_offset;    /* offset in file to begin read*/
WORD    smb_maxcnt;    /* max number of bytes to return (max 65,535)*/
WORD    smb_mincnt;    /* min number of bytes to return (normally 0)*/
DWORD   smb_timeout;   /* number of milliseconds to wait for completion*/
WORD    smb_rsvd;      /* reserved*/
WORD    smb_bcc;       /* value=0*/
```

---

Response is the raw data (one send).
Service:

The Read Block Raw protocol is used to maximize the performance of reading a large block of data from the server to the consumer.

The Read Block Raw command's scope includes (but is not limited to) files, Named Pipes and communication devices.

When this protocol is used, the consumer has guaranteed that there is (and will be) no other request on the VC for the duration of the Read Block Raw request. The server will respond with the raw data being read (one send). Thus, the consumer is able to request up to 65,535 bytes of data and receive it directly into the user buffer. Note that the amount of data requested is expected to be larger than the negotiated buffer size for this protocol.

The reason that no other requests can be active on the VC for the duration of the request is that if other receives are present on the VC, there is normally no way to guarantee that the data will be received into the user space; rather, the data may fill one (or more) of the other buffers.

The number of bytes actually returned is determined by the length of the message the consumer receives as reported by the transport layer (there are no overhead "header bytes").

If the request is to read more bytes than are present in the file, the read response will be of the length actually read from the file.

If none of the requested bytes exists (EOF) or an error occurs on the read, the server will respond with a zero byte send. Upon receipt of a zero length response, the consumer will send a "standard read" request to the sponse bytes to the consumer. Thus no "got the data you sent" protocol is needed.

If an error should occur at the consumer end, all bytes must be received and thrown away. There is no need to inform the server of the error.

Support of this protocol is optional.

Whether or not Read Block Raw is supported is returned in the response to negotiate and in the LANMAN 1.0 extended "Query Server Information" protocol.

The flow for reading a sequential file (or downloading a program) using the Read Block Raw protocol is:

---

```
consumer → OPEN for read request → server
consumer ← OPEN for succeeded response ← server
consumer → BLOCK READ RAW request 1 → server
consumer ← raw data returned ← server
consumer → BLOCK READ RAW request 2 → server
consumer ← raw data returned ← server
consumer → BLOCK READ RAW request n → server
consumer ← ZERO LEN SEND (EOF or ERROR) ← server
consumer → "standard" READ request → server
consumer ← READ response EOF/ERROR ← server
consumer → CLOSE request → server
consumer ← CLOSE succeeded response ← server
```

---

This approach minimizes the number of overhead protocols (and bytes) required.

Read Block Raw may generate NO errors. Because the response to this protocol is raw data only, a zero length response indicates EOF, a read error or that the server is temporarily out of large buffers. The consumer should then retry using a Multiplexed Read Request or a standard "core" read request. This request will then either return the EOF condition, an error if the read is still failing, or will work if the problem was due to being temporarily out of large buffers.

---

> ©1987 Microsoft Corporation

-continued
APPENDIX 2

SMB Protocol Extensions   November 7, 1988
9.2.23 WRITE BLOCK RAW
Primary Request Format: (smb_com = SMBwriteBraw)
```
       BYTE    smb_wct;       /* value = 12 */
       WORD    smb_fid;       /* file handle */
       WORD    smb_tcount     /* total bytes (including this buf, 65,535 max) */
       WORD    smb_rsvd;      /* reserved */
       DWORD   smb_offset     /* offset in file to begin write */
       DWORD   smb_timeout;   /* number of milliseconds to wait for completion */
       WORD    smb_wmode;     /* write mode:
                                   bit 0 -
                                       complete write to disk and send final result response
                                   bit 1 -
                                       return smb_remaining (pipes/devices only) */
       DWORD   smb_rsvd2;     /* reserved */
       WORD    smb_dsize;     /* number of data bytes this buffer (min value = 0) */
       WORD    smb_doff;      /* offset (from start of SMB hdr) to data bytes */
       WORD    smb_bcc;       /* total bytes (including pad bytes) following */
       BYTE    smb_pad();     /* (optional) to pad to word or dword boundary */
       BYTE    smb_data(*);   /* data bytes (* = value of smb_dsize) */
```
First Response Format (ok send the remaining data): (smb_com = SMBwriteBraw)
```
       BYTE    smb_wct;       /* value = 1 */
       WORD    smb_remaining; /* bytes remaining to be read (pipes/devices only) */
       WORD    smb_bcc;       /* value = 0 */
```
Secondary Response Format is the send of the raw data bytes:
Final Response Format (write through or error): (smb_com = SMBwriteC)
```
       BYTE    smb_wct;       /* value = 1 */
       WORD    smb_count;     /* total number of bytes written */
       WORD    smb_bcc;       /* value = 0 */
```

The Write Block Raw protocol is used to maximize the performance of writing a large block of data from the consumer to the server.

The Write Block Raw command's scope includes (but is not limited to) files, Named Pipes, communication devices, printer devices and spooled output (can be used in place of "Write Print File").

Note that the first response format will be that of the final response (SMBwriteC) in the case where the server gets an error while writing the data sent along with the request. Thus the word parameter is smb_count (the number of bytes which did get written) any time an error is returned. If an error occurs AFTER the first response has been sent allowing the consumer to send the remaining data, the final response should NOT be sent unless write through is set. Rather, the server should return this "write behind" error on the next access to the file/pipe/device.

When this protocol is used, the consumer has guaranteed that there is (and will be) no other request on the VC for the duration of the Write Block Raw request. The server will allocate (or reserve) enough memory to receive the data and respond with a response protocol message as defined above. The consumer will then send the raw data (one send).

Thus the server is able to receive up to 65,535 bytes of data directly into the server buffer. Note that the amount of data transferred is expected to be larger than the negotiated buffer size for this protocol.

The reason that no other requests can be active on the VC for the duration of the request is that if other receives are present on the VC, there is normally no way to guarantee that the data will be received into the large server buffer, rather the data may fill one (or more) of the other buffers. Also, if the consumer is sending other requests on the VC, a request may land in the buffer that the server has allocated for the Write Raw Data.

Support of this protocol is optional.

Whether or not Write Block Raw is supported is returned in the response to negotiate and in the LANMAN 1.0 extended "Query Server Information" protocol.

When write through is not specified (smb_wmode zero), this protocol is assumed to be a form of write behind. The transport layer guarantees delivery of all secondary requests from the consumer. Thus no "got the data you sent" protocol is needed. If an error should occur at the server end, all bytes must be received and thrown away. If an error occurs while writing data to disk such as disk full, the next access of the file handle (another write, close, read, etc.) will return the fact that the error occurred.

If write through is specified (smb_wmode set), the server will receive the data, write it to disk, and then send a final response indicating the result of the write (no error in smb_err indicates data is on disk OK). The total number of bytes written is also returned in this response.

```
consumer → WRITE BLOCK RAW request (optional data) → server
consumer ← OK send (more) data ← server
consumer → raw data → server
consumer ← data on disk or error (write through only) ← server
```

This protocol is set up such that the Write Block Raw request may also carry data. This is an optimization in that up to the server's buffer size (smb·maxxmt from negotiate response), minus the size of the Write Block Raw protocol request, may be sent along with the request. Thus, if the server is busy and unable to support the Raw Write of the remaining data, the data sent along with the request has been delivered and need not be sent again. The Server will write any data sent in the Write Block Raw request (and wait for it to be on the disk or device if write through is set), prior to sending the "send raw data" or "no resource" response.

The specific responses error class ERRSRV, error codes ERRusempx and ERRusestd, indicate that the server is temporarily out of large buffers needed to support the Raw Write of the remaining data, but that any data set along with the request has been successfully written. The consumer should then write the remaining data using Write Block Multiplexed (if ERRusempx was returned) or the standard "core" write request (if ERRusestd was returned), or delay and retry using the Write Block Raw request. If a write error occurs writing the initial data, it will be returned and the Write Raw request is implicitly denied.

Note that the primary request through the final response make up the complete protocol, thus the TID, PID, UID and MID are expected to remain constant and can be used by the consumer to route the individual messages of the protocol to the correct process.

The return field smb_remaining is to be returned for pipes or devices only. It is used to return the number of bytes currently available in the pipe or device. This information can then be used by the consumer to know when a subsequent (non blocking) read of the pipe or device may return some data. Note that when the read request is actually received by the server, there may be more or less actual data in the pipe or device (more data has been written to the pipe/device or another reader drained it). If the information is currently not available or the request is NOT for a pipe or device (or the server does not support this feature), a −1, value should be returned.

Write Block Raw may generate the following errors:

Error Class ERRDOS
ERRbadfid
ERRnoaccess
ERRlock
ERRbadfiletype
ERRbadaccess
<implementation specific>

Error Class ERRSRV
ERRerror
ERRinvnid
ERRnoresource
ERRtimeout
ERRusempx
ERRusetd
<implementation specific>

Error Class ERRHRD
<implementation specific>

What is claimed is:

1. A computer implemented method in a computer system for transmitting data from a server computer to a consumer computer connected by a virtual circuit, the consumer computer having an application program requesting a read from the server computer, having a redirector, and having a transport, the application program having access to a data buffer allocated by the application program, comprising the steps of:

allocating and initializing a receive network control block for directing the transport to store the next data it receives directly in the data buffer;

transmitting from the redirector to the transport a read request to read data from the server and said receive network control block for directing the transport to store the read data directly in the data buffer, the read request indicating that the read data should be transmitted without a header;

in response to the step of transmitting, sending the read request from the transport to the server computer;

examining and recognizing that the read request indicates that the read data should be transmitted without a header;

storing the read data in a data block without the header;

transferring the data block from the server computer to the transport in response to the step of sending the read request; and in response to the read request and the receive network control block and in response to the step of transferring, storing the data block directly from the transport into the data buffer.

2. The method of claim 1 that includes the step of ensuring that no requests to transmit data on the virtual circuit are pending before the read request is transmitted.

3. The method of claim 1, including the steps of:
locking the data buffer before transmitting the read request to ensure that the data buffer remains accessible until the read request is satisfied; and
unlocking the data buffer after the read data has been stored in the data buffer.

4. A computer implemented method in a computer system for transmitting data from a consumer computer to a server computer connected by a virtual circuit, the consumer computer having an application program requesting to transmit data to the server computer, having a redirector, and having a transport system, the application program having access to a data buffer allocated by the application program, the server computer having a memory, the method comprising the steps of:

formatting a write request command by the redirector to send to the transport system, the write request command indicating that the write data is to be transmitted without a header;

sending the write request command to the server computer from the transport system;

examining and recognizing that the write request command indicates that the write data is to be transmitted without a header;

allocating in response to the step of recognizing, a portion of the server memory to receive write data without a header;

sending a message from the server computer to the consumer computer indicating that the server computer is ready to receive the write data;

receiving the message sent from the server computer to the consumer computer indicating that the server computer is ready to receive the write data, said redirector allocating and initializing a send network control block for directing the transport to write the next data from the buffer to the server computer; and transmitting from the redirector to the transport the send network control block;

in response to the send network control block, transmitting the write data directly from the data buffer through the virtual circuit to the allocated portion of the server memory.

5. The method of claim 4, including the step of ensuring that no requests to transmit data are pending on the virtual circuit before the write request command is sent to the server computer.

6. The method of claim 4 wherein the data buffer is stored in a memory of the consumer computer, including the steps of:
- locking the data buffer before sending the write request command so as to ensure that only the application program can affect the content of the data buffer; and
- unlocking the data buffer after the transmitting step is completed.

7. A computer implemented method in a computer system for sending data from a first computer through a communications line to a second computer, the second computer having an application program requesting a read from the first computer, having a redirector, and having a transport, the application program having access to a data buffer allocated by the application program, the method comprising the steps of:
- allocating and initializing by the redirector a receive network control block for directing the transport to store the next data it receives directly in the data buffer;
- transmitting from the redirector to the transport a read request to read the requested data from the first computer and said receive network control block for directing the transport to store the requested data without a header directly in the data buffer;
- in response to the step of transmitting, sending the read request from the transport through the communications line to the first computer, the read request specifying that data is to be transmitted to the second computer;
- examining and recognizing that the read request indicates that the read data should be transmitted without a header;
- storing the read data in a data block without the header;
- ensuring that no requests to transmit data through the communications line are pending so that only the requested data without the header is transmitted on the communications line;
- in response to the step of insuring, transmitting the requested data without the header from the first computer through the communications line to the transport; and
- using information contained in the network control block, sending the requested data without the header from the transport directly to the data buffer.

8. The method of claim 7 including the steps of:
- locking the data buffer before sending the request to ensure that the data buffer remains accessible until the request is satisfied; and
- unlocking the data buffer after the requested data has been stored in the data buffer.

9. A computer implemented method in a computer system for sending data from a first computer through a communications line to a second computer, the second computer having an application program requesting a read from the first computer, having a redirector, and having a transport, the application program having access to a data buffer allocated by the application program the method comprising the steps of:
- allocating and initializing by the redirector a receive network control block for directing the transport to store the next data it receives directly in the data buffer;
- transmitting from the redirector to the transport a read request to read the requested data from the first computer and said receive network block for directing the transport to store the requested data without a header directed in the data buffer;
- in response to the step of transmitting, sending the read request from the transport through the communications line to the first computer, the read request specifying that data is to be transmitted to the second computer;
- examining and recognizing that the read request indicates that the read data should be transmitted without a header;
- storing the read data in a data block without the header;
- transmitting the requested data without the header from the first computer through the communications line to the transport; and
- using information contained in the network control block, sending the requested data without the header from the transport directly to the data buffer.

10. A computer implemented method in a computer system for sending data from a first computer through a communications line to a second computer, the second computer having an application program requesting a read from the first computer, having a redirector, and having a transport, the application program having access to a data buffer allocated by the application program, the method comprising the steps of:
- allocating and initializing by the redirector a receive network control block for directing the transport to store the next data it receives directly in the data buffer;
- transmitting from the redirector to the transport a read request to read the requested data from the first computer and said receive network control block for directing the transport to store the requested data without a header directly in the data buffer;
- in response to the step of transmitting, sending the read request from the transport through the communications line to the first computer, the read request specifying that data is to be transmitted to the second computer;
- storing the read data in a data block without the header;
- transmitting the requested data without the header from the first computer through the communications line to the transport; and
- using information contained in the network control block, sending the requested data without the header from the transport directly to the data buffer.

* * * * *